United States Patent
Calzia et al.

(10) Patent No.: US 8,894,760 B2
(45) Date of Patent: Nov. 25, 2014

(54) GROUP 3A INK AND METHODS OF MAKING AND USING SAME

(75) Inventors: Kevin Calzia, Philadelphia, PA (US); David W. Mosley, Philadelphia, PA (US)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 735 days.

(21) Appl. No.: 12/622,754

(22) Filed: Nov. 20, 2009

(65) Prior Publication Data

US 2011/0120343 A1    May 26, 2011

(51) Int. Cl.
| | | |
|---|---|---|
| *B05D 7/00* | (2006.01) | |
| *C23C 18/16* | (2006.01) | |
| *C09D 11/52* | (2014.01) | |
| *C23C 18/12* | (2006.01) | |

(52) U.S. Cl.
CPC ............ *C23C 18/1678* (2013.01); *C09D 11/52* (2013.01); *C23C 18/1204* (2013.01)
USPC ............................. 106/1.05; 427/226; 427/74

(58) Field of Classification Search
USPC ...................................... 427/74, 76, 226, 229
See application file for complete search history.

(56) References Cited

U.S. PATENT DOCUMENTS

| | | | |
|---|---|---|---|
| 5,863,836 A | 1/1999 | Jones | |
| 6,090,926 A | 7/2000 | Keyer et al. | |
| 6,127,202 A | 10/2000 | Kapur et al. | |
| 6,821,559 B2 | 11/2004 | Eberspacher et al. | |
| 7,524,528 B2 | 4/2009 | Kodas et al. | |
| 2003/0087516 A1* | 5/2003 | Arii et al. .................... | 438/636 |
| 2006/0083694 A1* | 4/2006 | Kodas et al. ................. | 424/46 |
| 2008/0280030 A1* | 11/2008 | Van Duren et al. .......... | 427/74 |
| 2009/0260670 A1* | 10/2009 | Li ................................ | 136/244 |

OTHER PUBLICATIONS

Allen, et al., Microcontact printing of indium metal using salt solution "ink", Thin Solid Films 515 (2007) 6812-6816.

Mitzi, et al., Low-voltage transistor employing a high mobility spin-coated chalcogenide semiconductor, Advanced Materials 17 (2005) 1285-1289.

* cited by examiner

*Primary Examiner* — Robert Vetere
(74) *Attorney, Agent, or Firm* — Thomas S. Deibert

(57) ABSTRACT

A Group 3a ink, comprising, as initial components: a polyamine solvent; a Group 3a material/organic complex; and, a reducing agent; wherein the molar concentration of the reducing agent exceeds the molar concentration of the Group 3a material/organic complex; wherein the Group 3a ink is a stable dispersion and wherein the Group 3a ink is hydrazine and hydrazinium free. Also provided are methods of preparing the Group 3a ink and of using the Group 3a ink to deposit a Group 3a material on a substrate for use in a variety of semiconductor applications, such as metallization of silicon devices in VLSI technology, the growth of semiconducting III-V alloys, thin film transistors (TFTs), light emitting diodes (LEDs); and infrared detectors.

8 Claims, No Drawings

GROUP 3A INK AND METHODS OF MAKING AND USING SAME

The present invention relates to a Group 3a ink comprising, as initial components: a polyamine solvent; a Group 3a material/organic complex; and a reducing agent; wherein the molar concentration of the reducing agent exceeds the molar concentration of the Group 3a material/organic complex; wherein the Group 3a ink is a stable dispersion and wherein the Group 3a ink is hydrazine and hydrazinium free. The present invention further relates to a method of preparing the Group 3a ink and for using the Group 3a ink to deposit a Group 3a metal in a zero valence state on a substrate.

The deposition of a Group 3a metal on a substrate is important for a variety of semiconductor applications, such as metallization of silicon devices in VLSI technology, the growth of semiconducting III-V alloys, thin film transistors (TFTs), light emitting diodes (LEDs); and infrared detectors.

In the field of semiconductor manufacturing, Group 3a materials (indium in particular) are of considerable current and future technological importance. For example, with the emergence and proliferation of copper as a preferred material for use in the formation of conductor transmission lines in integrated circuitry, copper-Group 3a material (e.g., Cu/In) alloys are of interest for improving the long term performance, electromigration resistance and reliability of copper based interconnects. In particular, indium containing III-V semiconductor materials are anticipated to play an increasingly important role in the development of electronic and optoelectronic devices.

A method of depositing a Group 3a metal (i.e., aluminum or indium) on a substrate is disclosed in U.S. Pat. No. 5,863,836 to Jones. Jones discloses a method of depositing an aluminum or indium film on a substrate comprising the steps of contacting the substrate with an aluminum or indium precursor and treating the precursor to decompose leaving the aluminum or indium deposited in the substrate, wherein the precursor is a tritertiary butyl compound of aluminum or indium.

A method of depositing indium selenide is disclosed by Mitzi, et al. in *Low-Voltage Transistor Employing a High-Mobility Spin-Coated Chalcogenide Semiconductor*, ADVANCED MATERIALS vol. 17, pp. 1285-89 (2005). Mitzi, et al. disclose the use of a hydrazinium precursor material for deposition of indium selenide to form an indium selenide channel of a thin film transistor.

The hydrazinium precursor materials disclosed by Mitzi, et al. remove hydrazine from the manufacturing step to produce selenium containing semiconductor films. Notwithstanding, Mitzi, et al. do not eliminate the need for hydrazine. Rather, Mitzi, et al. still utilize hydrazine in the preparation of the hydrazinium precursor materials. Moreover, hydrazinium ion precursors pose a significant explosion risk, as documented by Eckart W. Schmidt in his book, *Hydrazine and Its Derivatives: Preparation, Properties, and Applications*, JOHN WILEY & SONS pp 392-401 (1984). The presence of numerous metal ions exacerbates the risk of hydrazinium explosion or detonation. This can be a problem because residual hydrazinium salts may accumulate in process equipment during manufacture, presenting an unacceptable safety risk.

Accordingly, a need still exists for new Group 3a ink formulations designed to facilitate the deposition of a Group 3a metal on a substrate, which formulations are preferably hydrazine and hydrazinium free.

In one aspect of the present invention, there is provided a Group 3a ink, comprising, as initial components: a polyamine solvent; a Group 3a material/organic complex; and, a reducing agent; wherein the molar concentration of the reducing agent exceeds the molar concentration of the Group 3a material/organic complex; wherein the Group 3a ink is a stable dispersion and wherein the Group 3a ink is hydrazine and hydrazinium free.

In another aspect of the present invention, there is provided a method of preparing a Group 3a ink, comprising: providing a Group 3a material/organic complex; providing a reducing agent; providing a polyamine solvent; combining the Group 3a material/organic complex, the reducing agent and the polyamine solvent to produce the Group 3a ink; wherein the reducing agent is provided in molar excess relative to the Group 3a material/organic complex; wherein the Group 3a ink is a stable dispersion; and wherein the Group 3a ink is hydrazine and hydrazinium free.

In another aspect of the present invention, there is provided a Group 3a ink prepared by the method, comprising: providing a Group 3a material/organic complex; providing a reducing agent; providing a polyamine solvent; combining the Group 3a material/organic complex, the reducing agent and the polyamine solvent to produce the Group 3a ink; wherein the reducing agent is provided in molar excess relative to the Group 3a material/organic complex; wherein the Group 3a ink is a stable dispersion; and wherein the Group 3a ink is hydrazine and hydrazinium free.

In another aspect of the present invention, there is provided a method for providing a Group 3a metal on a substrate, comprising: providing a substrate; providing a Group 3a ink of the present invention; applying the Group 3a ink to the substrate forming a Group 3a precursor on the substrate; treating the Group 3a precursor to provide a Group 3a metal on the substrate.

In another aspect of the present invention, there is provided a method for preparing a Group 1a-1b-3a-6a material, comprising: providing a substrate; optionally, providing a Group 1a source comprising sodium; providing a Group 1b source; providing a Group 3a ink of the present invention; optionally, providing a Group 6a sulfur source; optionally, providing a Group 6a selenium source; providing at least one Group 1a-1b-3a-6a precursor material on the substrate by optionally using the Group 1a source to apply a sodium material to the substrate, using the Group 1b source to apply a Group 1b material to the substrate, using the Group 3a source to apply a Group 3a material to the substrate, optionally using the supplemental Group 3a source to apply additional Group 3a material to the substrate, optionally using the Group 6a sulfur source to apply a sulfur material to the substrate and using the Group 6a selenium source to apply a selenium material to the substrate to form the Group 1a-1b-3a-6a precursor material; treating the precursor material to form a Group 1a-1b-3a-6a material having a formula $Na_L X_m Y_n In_{(1-n)} S_p Se_q$; wherein X is at least one Group 1b material selected from copper and silver; wherein Y is the Group 3a material; wherein the Group 3a material is selected from gallium, indium and aluminum; wherein $0 \leq L \leq 0.75$; wherein $0.25 \leq m \leq 1.5$; wherein $0 \leq n < 1$; wherein $0 < p \leq 2.5$; wherein $0 \leq q \leq 2.5$; and, wherein $1.8 \leq (p+q) \leq 2.5$.

DETAILED DESCRIPTION

The term "stable" as used herein and in the appended claims in reference to the Group 3a ink means that the product formed by the combination of a Group 3a material/organic complex and a reducing agent in a polyamine solvent does not form a precipitate during storage of the Group 3a ink at 22° C. under nitrogen for a period of at least thirty (30) minutes.

The term "storage stable" as used herein and in the appended claims in reference to the Group 3a ink means that the product formed by the combination of a Group 3a material/organic complex and a reducing agent in a polyamine solvent does not form a precipitate during storage of the Group 3a ink at 22° C. under nitrogen for a period of at least sixteen (16) hours.

The term "extended stability" as used herein and in the appended claims in reference to the Group 3a ink means that the product formed by the combination of a Group 3a material/organic complex and a reducing agent in a polyamine solvent does not form a precipitate during storage of the Group 3a ink at 22° C. under nitrogen for a period of at least 5 days.

The term "hydrazine free" as used herein and in the appended claims in reference to the Group 3a ink means that the Group 3a ink contains <100 ppm hydrazine.

The term "hydrazinium free or $(N_2H_5)^+$ free" as used herein and in the appended claims in reference to the Group 3a ink means that the Group 3a ink contains <100 ppm hydrazinium complexed with a Group 3a metal.

The present invention relates to a Group 3a ink, the preparation of the Group 3a ink and the use of the Group 3a ink in the manufacture of Group 3a metal containing semiconductor devices; for example in the Group 3a metallization of silicon devices in VLSI technology, the growth of semiconducting III-V alloys, the preparation of thin film transistors (TFTs), the preparation of light emitting diodes (LEDs); and the preparation of infrared detectors. The following detailed description focuses on the use of the Group 3a inks of the present invention in the preparation of CIGS materials designed for use in photovoltaic cells. Notwithstanding, other uses of the Group 3a inks of the present invention will be readily apparent given the teachings provided herein.

The Group 3a ink of the present invention comprises, as initial components: a polyamine solvent; a Group 3a material/organic complex (preferably a Group 3a material/carboxylate complex); and, a reducing agent; wherein the molar concentration of the reducing agent exceeds the molar concentration of the Group 3a material/organic complex (preferably the Group 3a material/carboxylate complex); wherein the Group 3a ink is a stable dispersion (preferably storage stable, more preferably extended stability); and wherein the Group 3a ink is hydrazine and hydrazinium free.

The polyamine solvent used in the Group 3a ink of the present invention is selected from polyamine solvents containing at least two amine groups. Preferably, the polyamine solvent used in the Group 3a ink of the present invention is selected from ethylenediamine; diethylenetriamine; triethylenetetramine; tetramethylguanidine; 1,3-diaminopropane; 1,2-diaminopropane; and 1,2-diaminocyclohexane. More preferably, the polyamine solvent used in the Group 3a ink of the present invention is selected from ethylenediamine; diethylenetriamine; triethylenetetramine; 1,3-diaminopropane and tetramethylguanidine. Still more preferably, the polyamine solvent used in the Group 3a ink of the present invention is selected from ethylenediamine; 1,3-diaminopropane and tetramethylguanidine. Most preferably, the polyamine solvent used in the Group 3a ink of the present invention is ethylenediamine.

Group 3a material/organic complex used in the Group 3a ink of the present invention is selected from an aluminum/organic complex, an indium/organic complex and a gallium/organic complex. Preferably, the organic in the Group 3a material/organic complex is selected from carboxylates and beta-dicarbonyls. More preferably, the organic used in the Group 3a material/organic complex is selected from carboxylates and beta-dicarbonyls, wherein the organic has a number average molecular weight of 25 to 10,000 (preferably 35 to 1,000), wherein organic having a number average molecular weight of 25 to <35 has a molecular formula with ≤1 nitrogen atom. Optionally, the Group 3a material/organic complex used in the Group 3a ink of the present invention is a Group 3a material/carboxylate complex selected from an aluminum/carboxylate complex, an indium/carboxylate complex and a gallium/carboxylate complex. Preferred organic used in the Group 3a material/organic complex is selected from 2-ethylhexanoate, 2-ethylbutyrate, acetylacetonoate, trimethylacetate, acetate, formate and isovalerate. Preferably, the Group 3a material/organic complex used in the Group 3a ink of the present invention is selected from an indium/organic complex and a gallium/organic complex. More preferably, the Group 3a material/organic complex used in the Group 3a ink of the present invention is an indium/organic complex. Still more preferably, the Group 3a material/organic complex used in the Group 3a ink of the present invention is an indium/organic complex comprising an indium (III) cation complexed with at least one organic anion selected from 2-ethylhexanoate, 2-ethylbutyrate, acetylacetonoate, trimethylacetate, acetate, formate and isovalerate. Yet still more preferably, the Group 3a material/organic complex used in the Group 3a ink of the present invention is an indium/carboxylate complex comprising an indium (III) cation complexed with at least one carboxylate anion selected from 2-ethylhexanoate and 2-ethylbutyrate. Most preferably, the Group 3a material/organic complex used in the Group 3a ink of the present invention is an indium/carboxylate complex comprising an indium (III) cation complexed with at least one 2-ethyhexanoate anion.

The Group 3a material/organic complex (preferably Group 3a material/carboxylate complex) content of the Group 3a ink of the present invention can be selectively provided to suit the particular application need and the processing technology and equipment to be used to apply the Group 3a ink to a given substrate. Optionally, the Group 3a ink exhibits a Group 3a material/organic complex (preferably a Group 3a material/carboxylate complex) content selected to provide the Group 3a ink with a Group 3a material in an amount selected from ≥0.5 wt %; more preferably 0.5 to 25 wt %; still more preferably 0.5 to 10 wt %; most preferably 0.5 to 5 wt % Group 3a material (based on the weight of the Group 3a ink); wherein the Group 3a material is selected from aluminum, indium and gallium; preferably indium and gallium; most preferably indium. Optionally, the Group 3a ink exhibits a Group 3a material content of ≥0.5 wt % (based on the weight of the Group 3a ink). Optionally, the Group 3a ink exhibits a Group 3a material content of 0.5 to 25 wt % (based on the weight of the Group 3a ink). Optionally, the Group 3a ink exhibits a Group 3a material content of 0.5 to 10 wt % (based on the weight of the Group 3a ink). Optionally, the Group 3a ink exhibits a Group 3a material content of 0.5 to 5 wt % (based on the weight of the Group 3a ink).

The reducing agent used in the Group 3a ink of the present invention has a molecular weight selected from (a) ≥35 and (b) <35; wherein traceless reducing agent having a molecular weight <35 has a molecular formula with ≤1 nitrogen atom. Optionally, the reducing agent used has a molecular weight selected from (a) between 35 and 10,000; and (b) between 1 and <35 (preferably between 10 and <35); wherein reducing agent having a molecular weight between 10 and <35 has a molecular formula with ≤1 nitrogen atom. Optionally, the reducing agent used in the Group 3a ink of the present invention has a molecular formula with ≤1 nitrogen atom. Preferably, the reducing agent used in the Group 3a ink of the present invention is selected from formic acid; ammonium formate; ammonium oxalates; oxalic acid; formamides (e.g., dimethylformamide); lactates; carbon monoxide; hydrogen; isoascorbic acid; sulfur dioxide; acetaldehyde; aldehydes (e.g., formaldehyde, ethylaldehyde, propylaldehyde, heptaldehyde) and combinations thereof. More preferably, the reducing agent used is selected from ammonium formate, formic acid, ammonium oxalate, heptaldehyde and oxalic acid. Still more preferably, the reducing agent used is selected from ammonium formate and formic acid. Most preferably, the reducing agent used is formic acid.

Preferably, the molar ratio of the reducing agent to the Group 3a material/organic (preferably Group 3a material/carboxylate complex) in the Group 3a ink of the present invention is at least 10:1; more preferably 15:1; still more preferably 15:1 to 50:1; yet still more preferably 18:1 to 30:1; most preferably 18:1 to 25:1.

Preferably, the Group 3a ink of the present invention is an indium ink, comprising, as initial components: a polyamine solvent; an indium/organic complex (preferably an indium/carboxylate complex); and, a reducing agent; wherein the molar concentration of the reducing agent exceeds the molar concentration of the indium/organic complex (preferably indium/carboxylate complex); wherein the indium ink is a stable dispersion (preferably a storage stable dispersion, more preferably an extended stability dispersion); and wherein the indium ink is hydrazine and hydrazinium free. The polyamine solvent used in the indium ink is selected from polyamine solvents containing at least two amine groups. Preferably, the polyamine solvent used in the indium ink is selected from ethylenediamine; diethylenetriamine; triethylenetetramine; tetramethylguanidine; 1,3-diaminopropane; 1,2-diaminopropane; and 1,2-diaminocyclohexane (more preferably from ethylenediamine; diethylenetriamine; triethylenetetramine; 1,3-diaminopropane and tetramethylguanidine; still more preferably from ethylenediamine; 1,3-diaminopropane and tetramethylguanidine; most preferably, the polyamine solvent is ethylenediamine). Preferably, the organic in the indium/organic complex is selected from carboxylates and beta-dicarbonyls. More preferably, the indium/organic complex used in the indium ink comprises an indium (III) cation complexed with at least one organic anion selected from 2-ethylhexanoate, 2-ethylbutyrate, acetylacetonate, trimethylacetate, acetate, formate and isovalerate (preferably from 2-ethylhexanoate and 2-ethylbutyrate; most preferably 2-ethyhexanoate). Preferably, the indium ink contains ≥0.5 wt %; more preferably 0.5 to 25 wt %; still more preferably 0.5 to 10 wt %; most preferably 0.5 to 5 wt % indium (based on the weight of the indium ink). Preferably, the reducing agent used in the indium ink is formic acid. Preferably, the molar ratio of the reducing agent to the indium/organic complex used in the indium ink is at least 10:1; more preferably 15:1; still more preferably 15:1 to 50:1; yet still more preferably 18:1 to 30:1; most preferably 18:1 to 25:1.

The Group 3a ink of the present invention can, optionally, further comprise a cosolvent. Cosolvents suitable for use with the present invention are miscible with the polyamine solvent.

The Group 3a ink of the present invention can, optionally, further comprise at least one optional additive selected from a dispersant, a wetting agent, a polymer, a binder, an antifoaming agent, an emulsifying agent, a drying agent, a filler, an extender, a film conditioning agent, an antioxidant, a plasticizer, a preservative, a thickening agent, a flow control agent, a leveling agent, a corrosion inhibitor and a dopant (e.g., sodium to improve electrical performance of CIGS materials). Optional additives can be incorporated into the Group 3a ink of the present invention to, for example, facilitate increased shelf life, to improve flow characteristics to facilitate the method of application to a substrate (e.g., printing, spraying), to modify the wetting/spreading characteristics of the ink onto the substrate, to enhance the compatibility of the Group 3a with other inks used to deposit other components on the substrate (e.g., other constituents of a CIGS material, such as Cu, Se and S), and to modify the decomposition temperature of the Group 3a ink.

The method of the present invention for preparing a Group 3a ink of the present invention, comprises: providing a Group 3a material/organic complex (preferably a Group 3a material/carboxylate complex); providing a reducing agent; providing a polyamine solvent; combining the Group 3a material/organic complex, the reducing agent and the polyamine solvent to produce the Group 3a ink; wherein the reducing agent is provided in molar excess relative to the Group 3a material/organic complex (preferably, wherein ≥10 molar equivalents of the reducing agent is provided relative to the Group 3a material/organic complex); wherein the Group 3a ink is a stable dispersion; and wherein the Group 3a ink is hydrazine and hydrazinium free. Preferably, the molar ratio of the reducing agent to the Group 3a material/organic complex (preferably Group 3a material/carboxylate complex) provided is at least 10:1; more preferably 15:1 to 50:1; yet still more preferably 18:1 to 30:1; most preferably 18:1 to 25:1.

Preferably, the Group 3a material used in making the Group 3a ink of the present invention is selected from aluminum, indium and gallium (more preferably the Group 3a material is selected from indium and gallium; most preferably the Group 3a material is indium) and the Group 3a material contributes ≥0.5 wt %; more preferably 0.5 to 25 wt %; still more preferably 0.5 to 10 wt %; most preferably 0.5 to 5 wt % to the Group 3a ink (based on the weight of the indium ink). Most preferably, the Group 3a material is indium and the Group 3a ink is an indium ink comprising ≥0.5 wt %; more preferably 0.5 to 25 wt %; still more preferably 0.5 to 10 wt %; most preferably 0.5 to 5 wt % indium (based on the weight of the indium ink).

The Group 3a material/organic complex (preferably Group 3a material/carboxylate complex) of the present invention can be prepared using well known methods. For example, a Group 3a material/organic complex of the present invention can be prepared by reacting a Group 3a metal hydroxide and an organic acid (e.g. a carboxylic acid) in water to form the complex. The complex formed can then, optionally, be isolated from solution, if desired.

Preferably, in the method of preparing the Group 3a ink of the present invention, the Group 3a material/organic complex (preferably Group 3a material/carboxylate complex) and the polyamine solvent are combined by adding the Group 3a material/organic complex to the polyamine solvent. More preferably, the Group 3a material/organic complex (preferably Group 3a material/carboxylate complex) and the polyamine solvent are combined using inert techniques, followed with continuous agitation and heating. Preferably, the polyamine solvent is maintained at a temperature of 20 to 240° C. during the combining of the polyamine solvent and the Group 3a material/organic complex (preferably Group 3a material/carboxylate complex).

Preferably, in the method of preparing the Group 3a ink of the present invention, the timing of the addition of the reducing agent depends on the physical state of the reducing agent used. For solid reducing agents, the solid reducing agent is preferably combined with the Group 3a material/organic complex (preferably Group 3a material/carboxylate complex) before addition of the liquid carrier. For liquid reducing agents, the liquid reducing agent is preferably added to the combined Group 3a material/organic complex and the polyamine solvent.

When using a liquid reducing agent, the method of preparing the Group 3a ink of the present invention optionally further comprises heating the combined Group 3a material/organic complex (preferably Group 3a material/carboxylate complex) and polyamine solvent before adding the liquid reducing agent. Preferably, the method of preparing the Group 3a ink of the present invention optionally further comprises: heating the combined Group 3a material/organic complex (preferably Group 3a material/carboxylate complex) and polyamine solvent before and during the addition of any liquid reducing agent. More preferably, the combined Group 3a material/organic complex (preferably Group 3a material/carboxylate complex) and polyamine solvent are maintained at a temperature of 20 to 240° C. during the addition of the reducing agent. Optionally, any liquid reducing agents are added to the combined Group 3a material/organic complex (preferably Group 3a material/carboxylate complex) and polyamine solvent by gradually adding the liquid reducing agent to the combined Group 3a material/organic complex and polyamine solvent with continuous agitation, heating and reflux.

Optionally, the method of preparing the Group 3a ink of the present invention, further comprises: providing a cosolvent; and, combining the cosolvent with the polyamine solvent.

Optionally, the method of preparing the Group 3a ink of the present invention, further comprises: providing at least one optional additive; and, combining the at least one optional additive with the polyamine solvent; wherein the at least one optional additive is selected from a dispersant, a wetting agent, a polymer, a binder, an anti-foaming agent, an emulsifying agent, a drying agent, a filler, an extender, a film conditioning agent, an antioxidant, a plasticizer, a preservative, a thickening agent, a flow control agent, a leveling agent, a corrosion inhibitor and a dopant.

The Group 3a ink of the present invention can be used in the preparation of a variety of Group 3a metal (i.e., aluminum, gallium and indium; preferably indium) containing semiconductor materials (e.g., thin film transistors, solar cells, infrared detectors).

The method of the present invention for providing a Group 3a metal on a substrate, comprises: providing a substrate; providing a Group 3a ink of the present invention; applying the Group 3a ink to the substrate forming a Group 3a precursor on the substrate; treating the Group 3a precursor to provide a Group 3a metal on the substrate; wherein the Group 3a metal is selected from aluminum, indium and gallium (preferably the Group 3a metal is selected from indium and gallium; most preferably the Group 3a metal is indium). Preferably, 75 to 100 mol %; more preferably 85 to 100 mol %; most preferably 90 to 100 mol % of the Group 3a metal provided on the substrate is in a zero valence state (e.g., $In^0$).

The Group 3a ink of the present invention can be applied to a substrate using conventional processing techniques such as wet coating, spray coating, spin coating, doctor blade coating, contact printing, top feed reverse printing, bottom feed reverse printing, nozzle feed reverse printing, gravure printing, microgravure printing, reverse microgravure printing, comma direct printing, roller coating, slot die coating, meyerbar coating, lip direct coating, dual lip direct coating, capillary coating, ink jet printing, jet deposition, spray pyrolysis and spray deposition. Preferably, the Group 3a ink of the present invention is applied to a substrate using conventional spray pyrolysis techniques. Preferably, the Group 3a ink of the present invention is applied to a substrate under an inert atmosphere (e.g., under nitrogen).

When treating the Group 3a precursor applied to a substrate to provide a Group 3a metal on the substrate, the Group 3a precursor is preferably heated to a temperature above the boiling point temperature of the polyamine solvent to facilitate the removal of the of the polyamine solvent, the reducing agent, the carboxylate anion(s) and vestages thereof. Optionally, the Group 3a precursor is treated in at least two steps. First, the Group 3a precursor is heated to a temperature of 5 to 200° C., preferably 100 to 200° C., optionally under vacuum; to remove the bulk of the polyamine solvent. Second, the Group 3a precursor is heated to a temperature >200° C. (preferably 200 to 500° C., more preferably 250 to 350° C.) to facilitate the decomposition of the Group 3a material/carboxylate complex and the removal of the carboxylate anion(s) and the reducing agent.

The method of the present invention for preparing a Group 1a-1b-3a-6a material, comprises: providing a substrate; optionally, providing a Group 1a source comprising sodium; providing a Group 1b source; providing a Group 3a ink of the present invention; optionally, providing a supplemental Group 3a source; optionally, providing a Group 6a sulfur source; optionally, providing a Group 6a selenium source; providing at least one Group 1a-1b-3a-6a precursor material on the substrate by optionally using the Group 1a source to apply a sodium material to the substrate, using the Group 1b source to apply a Group 1b material to the substrate, using the Group 3a source to apply a Group 3a material to the substrate, optionally using the supplemental Group 3a source to apply additional Group 3a material to the substrate, optionally using the Group 6a sulfur source to apply a sulfur material to the substrate and using the Group 6a selenium source to apply a selenium material to the substrate to form the Group 1a-1b-3a-6a precursor material; treating the precursor material to form a Group 1a-1b-3a-6a material having a formula $Na_L X_m Y_n S_p Se_q$; wherein X is at least one Group 1b material selected from copper and silver (preferably copper); Y is at least one Group 3a material selected from aluminum, gallium and indium (preferably indium and gallium, more preferably indium); wherein $0 \leq L \leq 0.75$; wherein $0.25 \leq m \leq 1.5$; where n is 1; where $0 \leq p < 2.5$; and, wherein $0 < q \leq 2.5$. Preferably, $0.5 \leq (L+m) \leq 1.5$ and $1.8 \leq (p+q) \leq 2.5$. Preferably, Y is $(In_{1-b}Ga_b)$, wherein $0 \leq b \leq 1$. More preferably, the Group 1a-1b-3a-6a material is according to the formula $Na_L Cu_m In_{(1-d)} Ga_d S_{(2+e)(1-f)} Se_{(2+e)f}$; wherein $0 \leq L \leq 0.75$, wherein $0.25 \leq m \leq 1.5$, wherein $0 \leq d \leq 1$, wherein $-0.2 \leq e \leq 0.5$, wherein $0 < f \leq 1$; wherein $0.5 \leq (L+m) \leq 1.5$ and wherein $1.8 \leq \{(2+e)f+(2+e)(1-f)\} \leq 2.5$. The components of the precursor material can be treated by known methods to form the Group 1a-1b-3a-6a material having formula $Na_L X_m Y_n S_p Se_q$. Preferably, treating the precursor material, comprising annealing. Annealing temperatures for the deposited components can range from 200 to 650° C. with annealing times of 0.5 to 60 minutes. Optionally, additional Group 6a material can be introduced during the annealing process in the form of at least one of a selenium ink, selenium vapor, selenium powder, hydrogen selenide gas, sulfur powder and hydrogen sulfide gas. The precursor materials can optionally be heated to the annealing temperature by use of a rapid thermal processing protocol, such as with the use of a high-powered quartz lamp, a laser or microwave heating methods. The precursor materials can optionally be heated to the annealing temperature using traditional heating methods, for example in a furnace.

A preferred type of Group 1a-1b-3a-6a material is a CIGS material. A preferred method of the present invention comprises a method for preparing a CIGS material, comprising:

providing a substrate; providing a copper source; providing an indium ink; optionally, providing a gallium source; optionally, providing a sulfur source and providing a selenium source; forming at least one CIGS precursor layer on the substrate by depositing a copper material on the substrate using the copper source, depositing an indium material on the substrate using the indium ink, optionally depositing a gallium material on the substrate using the gallium source, optionally depositing a sulfur material on the substrate using the sulfur source and depositing a selenium material on the substrate using the selenium source; treating the at least one CIGS precursor layer to form a CIGS material having a formula $Cu_v In_w Ga_x Se_y S_z$; wherein $0.5 \leq v \leq 1.5$ (preferably $0.85 \leq v \leq 0.95$), $0 < w \leq 1$ (preferably $0.68 \leq w \leq 0.75$, more preferably w is 0.7), $0 \leq x \leq 1$ (preferably $0.25 \leq x \leq 0.32$, more preferably x is 0.3), $0 < y \leq 2.5$; and, $0 \leq z < 2.5$. Preferably $(w+x)=1$ and $1.8 \leq (y+z) \leq 2.5$. More preferably, the CIGS material prepared has a formula $CuIn_{1-b} Ga_b Se_{2-c} S_c$, wherein $0 \leq b < 1$ and $0 \leq c < 2$. The components of the CIGS precursor layer(s) can be treated by known methods to form the CIGS material having formula $Cu_v In_w Ga_x S_y Se_z$.

Group 1a sources suitable for use in accordance with the present invention include any conventional vehicles for depositing sodium on a substrate using liquid deposition techniques, vacuum-evaporation techniques, chemical vapor deposition techniques, sputtering techniques or any other conventional process for depositing sodium on a substrate. Preferably, the Group 1a source can be incorporated with one or more of the Group 1b source, the Group 3a ink, the supplemental Group 3a source, the Group 6a sulfur source, and the Group 6a selenium source. Alternatively, the sodium may be deposited on a substrate using a separate Group 1a source.

Group 1b sources suitable for use in accordance with the present invention include any conventional vehicles for depositing a Group 1b material on a substrate using liquid deposition techniques, vacuum-evaporation techniques, chemical vapor deposition techniques, sputtering techniques or any other conventional process for depositing a Group 1b material on the substrate. Preferably, the Group 1b material includes at least one of copper and silver; more preferably copper. Optionally, the Group 1b source contains selenium in addition to a Group 1b material (e.g., $Cu_h Se_j$, $Ag_h Se_j$).

Supplemental Group 3a sources suitable for use in accordance with the present invention include any conventional vehicles for depositing a Group 3a material on a substrate using liquid deposition techniques, vacuum-evaporation techniques, chemical vapor deposition techniques, sputtering techniques or any other conventional process for depositing a Group 3a material onto a substrate. Preferably, the Group 3a material provided using the supplemental Group 3a source includes at least one of gallium, indium and aluminum; more preferably gallium and indium; most preferably gallium. Optionally, the supplemental Group 3a source contains selenium in addition to the Group 3a material (e.g., GaSe). Optionally, the supplemental Group 3a source contains copper and selenium in addition to the Group 3a material (e.g., CIGS nanoparticles).

Group 6a sulfur sources suitable for use in accordance with the present invention include any conventional vehicles for depositing a sulfur material on a substrate using liquid deposition techniques, vacuum-evaporation techniques, chemical vapor deposition techniques, sputtering techniques or any other conventional process for depositing sulfur onto a substrate.

Group 6a selenium sources suitable for use in accordance with the present invention include any conventional vehicles for depositing a selenium material on a substrate using liquid deposition techniques, vacuum-evaporation techniques, chemical vapor deposition techniques, sputtering techniques or any other conventional process for depositing selenium onto a substrate.

The substrate used in the method of the invention can be selected from conventional materials used in conjunction with the preparation of a semiconductor comprising a Group 3a metal. For use in some applications, the substrate can be preferably selected from silicon, molybdenum and copper. For use in the preparation of CIGS materials for use in photovoltaic devices, the substrate is most preferably molybdenum. In some applications, the molybdenum or copper substrate can be a coating on a carrier substance, such as, glass, foil, and plastic (e.g., polyethylene terephthalate and polyimides). Optionally, the substrate is sufficiently flexible to facilitate roll-to-roll production of CIGS materials for use in photovoltaic devices.

In the method of the present invention for forming a CIGS material on a substrate, 1 to 20 CIGS precursor layers are deposited on the substrate to form the CIGS material. Preferably 2 to 8, CIGS precursor layers are deposited on the substrate to form the CIGS material. The individual CIGS precursor layers each comprise at least one of a copper, silver, gallium, indium, sulfur and selenium. Optionally, at least one of the CIGS precursor layers comprise at least one Group 1b material selected from copper and silver; at least one Group 3a material selected from gallium and indium and at least one Group 6a material selected from sulfur and selenium.

Using the method of depositing a Group 3a metal of the present invention, it is possible to provide uniform or graded semiconductor films comprising a Group 3a metal (e.g., a CIGS material). For example, a graded CIGS material can be prepared by depositing varying concentrations of the components deposited (i.e., by depositing multiple layers of the precursor materials in different compositions). In the preparation of CIGS materials it is sometimes desirable to provide graded films (e.g., with respect to Ga concentration). It is conventional to provide a graded Ga/(Ga+In) ratio as a function of depth in a CIGS material for use in photovoltaic devices to facilitate improved separation of the photogenerated charge carriers and to facilitate reduced recombination at the back contact. Accordingly, it is believed to be desirable to tailor the CIGS material composition to achieve the desired grain structure and the highest efficiency photovoltaic device characteristics.

Example 1

Group 3a Material/Carboxylate Complex Synthesis

A magnetic stir bar was placed in a 250 ml round bottom flask to which 68.6 ml (0.0693 mols) of 1.011 M NaOH was added. 10.0 g (0.0693 mol) of 2-ethyhexanoic acid was slowly added to the NaOH solution and allowed to stir for 15 minutes at room temperature. An equal volume of hexane, 46.0 g, was added to the flask and two phases formed. 6.95 g (0.0231 mols) of indium nitrate was added slowly to the flask with stirring. The indium nitrate was observed to quickly dissolve in the water phase, followed by the formation of a white precipitate. The mixture in the flask was allowed to stir for one hour at room temperature, wherein the white precipitate dissolved into the hexane phase. The hexane phase was separated and washed three times with deionized water. The hexane was then extracted with a roto-vap leaving a viscous oil. The viscous oil was dried overnight in a vacuum oven at 50° C. leaving a waxy solid. Yield ~4.64 g, 36.9 wt %.

Comparative Examples C2-05 and C7; and Example 6

Inks were prepared using the components and amounts identified in Table 1 using the following method. A stir bar was placed in a screw top vial to which the indicated amount of product prepared according to Example 1 (indium (III) 2-ethylhexanoate) was weighed out and added. The noted solvent in the amount indicated in Table 1 was then added to the vial. If a reducing agent was included in the ink formulation, it was then added to the vial drop wise, very slowly. The contents of the vial were then stirred for an hour or until all of the indium (III) 2-ethylhexanoate product from Example 1 dissolved into solution. The inks prepared in each of examples 2-7 were observed to exhibit extended stability. Specifically, upon storage at room temperature in an air or nitrogen atmosphere, each of the inks were observed to be stabile for at least thirty days (i.e., no precipitate formed during storage).

TABLE 1

| Ex. | Product of Ex. 1 (g) | Reducing Agent (RA) | (RA) liquid-(l) solid-(s) | Mass RA (g) | Polyamine Solvent | Mass solvent (g) |
|---|---|---|---|---|---|---|
| C2 | 0.089 | — | — | — | Ethylenediamine | 1.80 |
| C3 | 0.237 | — | — | — | Hexylamine | 1.00 |
| C4 | 0.237 | Formic acid | (l) | 0.020 | Ethylenediamine | 1.00 |
| C5 | 0.237 | — | — | — | Ethylenediamine | 1.00 |
| 6 | 0.237 | Formic acid | (l) | 0.401 | Ethylenediamine | 1.00 |
| C7 | 0.237 | Formic acid | (l) | 0.401 | Hexylamine | 1.00 |

Comparative Example 8

Preparation of Film on Molybdenum Substrate

A molybdenum foil substrate was preheated on a hotplate set at 60° C. in a glove box under a nitrogen atmosphere. Two drops of the ink prepared according to Comparative Example 2 were deposited on the preheated molybdenum foil substrate. The hotplate temperature set point was quickly ramped to 220° C. and held for three minutes followed by another quick hotplate temperature set point ramp to 425° C. and held for five minutes. The coated molybdenum foil was placed on the bench top and allowed to cool to room temperature.

The film was then analyzed by x-ray diffraction (2-theta scan) using a Rigaku D/MAX 2500 at 50 kV/200 mA of nickel filtered copper Kα radiation. The sample was scanned from 5 to 80 degrees of 2θ in steps of 0.03 degrees at 0.25 degrees/minute. Reflection geometry was used and the sample was rotated at 20 RPM. The sample was mounted in a standard volume x-ray diffraction sample holder using modeling clay and then leveled until the top surface of the sample was on the focusing plane of the instrument. The scan output was then compared with scans for compounds in standard crystallography databases to verify that the film formed on the surface of the molybdenum substrate was indium oxide ($In_2O_3$).

Comparative Example 9

Preparation of Film on Molybdenum Substrate

A molybdenum foil substrate was preheated on a hotplate set at 60° C. in a glove box under a nitrogen atmosphere. Two drops of the ink prepared according to Comparative Example 3 were deposited on the preheated molybdenum foil substrate. The hotplate temperature set point was quickly ramped to 220° C. and held for three minutes followed by another quick hotplate temperature set point ramp to 425° C. and held for five minutes. The coated molybdenum foil was placed on the bench top and allowed to cool to room temperature.

The film was then analyzed by x-ray diffraction (2-theta scan) using a Rigaku D/MAX 2500 at 50 kV/200 mA of nickel filtered copper Kα radiation. The sample was scanned from 5 to 80 degrees of 2θ in steps of 0.03 degrees at 0.25 degrees/minute. Reflection geometry was used and the sample was rotated at 20 RPM. The sample was mounted in a standard volume x-ray diffraction sample holder using modeling clay and then leveled until the top surface of the sample was on the focusing plane of the instrument. The scan output was then compared with scans for compounds in standard crystallography databases to verify that the film formed on the surface of the molybdenum substrate comprised a combination of indium oxide ($In_2O_3$) and indium metal.

Comparative Example 10

Preparation of Film on Molybdenum Substrate

A molybdenum foil substrate was preheated on a hotplate set at 60° C. in a glove box under a nitrogen atmosphere. Two drops of the Group 3a (indium) ink prepared according to Example 4 were deposited on the preheated molybdenum foil substrate. The hotplate temperature set point was quickly ramped to 220° C. and held for three minutes followed by another quick hotplate temperature set point ramp to 425° C. and held for five minutes. The coated molybdenum foil was placed on the bench top and allowed to cool to room temperature.

The film was then analyzed by x-ray diffraction (2-theta scan) using a Rigaku D/MAX 2500 at 50 kV/200 mA of nickel filtered copper Kα radiation. The sample was scanned from 5 to 80 degrees of 2θ in steps of 0.03 degrees at 0.25 degrees/minute. Reflection geometry was used and the sample was rotated at 20 RPM. The sample was mounted in a standard volume x-ray diffraction sample holder using modeling clay and then leveled until the top surface of the sample was on the focusing plane of the instrument. The scan output was then compared with scans for compounds in standard crystallography databases to verify that the film formed on the surface of the molybdenum substrate was indium oxide ($In_2O_3$).

Comparative Example 11

Preparation of Film on Molybdenum Substrate

A molybdenum foil substrate was preheated on a hotplate set at 60° C. in a glove box under a nitrogen atmosphere. Two drops of the ink prepared according to Comparative Example 5 were deposited on the preheated molybdenum foil substrate. The hotplate temperature set point was quickly ramped to 220° C. and held for three minutes followed by another quick hotplate temperature set point ramp to 425° C. and held for five minutes. The coated molybdenum foil was placed on the bench top and allowed to cool to room temperature.

The film was then analyzed in a Thermo K-Alpha XPS instrument using a monochromatic beam of the Al k-alpha (1486.60 eV) anode. Several 400 mm areas of the film were analyzed. Charge compensation was used. The film was stored under nitrogen and transferred in air as quickly as possible into the vacuum chamber of the XPS instrument. Data analysis was performed using Avantage version 4. The results are reported in Table 2, noting that the atomic percentages reported were normalized after neglecting the molybdenum percentage.

TABLE 2

|  | Element | | | |
| --- | --- | --- | --- | --- |
|  | Indium | Oxygen | Carbon | Nitrogen |
| Average Atomic % | 33.7 | 31.9 | 33.1 | 1.3 |
| Standard deviation Atomic % | 3.8 | 1.5 | 2.2 | 1.1 |

Example 12

Preparation of Film on Molybdenum Substrate

A molybdenum foil substrate was preheated on a hotplate set at 60° C. in a glove box under a nitrogen atmosphere. Two drops of the Group 3a (indium) ink prepared according to Example 6 were deposited on the preheated molybdenum foil substrate. The hotplate temperature set point was quickly ramped to 220° C. and held for three minutes followed by another quick hotplate temperature set point ramp to 425° C. and held for five minutes. The coated molybdenum foil was placed on the bench top and allowed to cool to room temperature.

The film was then analyzed in a Thermo K-Alpha XPS instrument using a monochromatic beam of the Al k-alpha (1486.60 eV) anode. Several 400 mm areas of the film were analyzed. Charge compensation was used. The film was stored under nitrogen and transferred in air as quickly as possible into the vacuum chamber of the XPS instrument. Data analysis was performed using Avantage version 4. The results are reported in Table 3, noting that the atomic percentages reported were normalized after neglecting the molybdenum percentage. Note that at least 92.7 mole % of the indium deposited in the film was indium metal (i.e., assuming all of the oxygen present in the film was associated with the indium). Most likely, however, the actual percentage of metallic indium deposited was higher than 92.7%, given that at least some of the oxygen was likely associated with the carbon.

TABLE 3

|  | Element | | | |
| --- | --- | --- | --- | --- |
|  | Indium | Oxygen | Carbon | Nitrogen |
| Average Atomic % | 78.9 | 6.2 | 14.9 | — |
| Standard deviation Atomic % | 6.0 | 0.7 | 5.6 | — |

Comparative Example 13

Preparation of Film on Molybdenum Substrate

A molybdenum foil substrate was preheated on a hotplate set at 60° C. in a glove box under a nitrogen atmosphere. Two drops of the ink prepared according to Comparative Example 7 were deposited on the preheated molybdenum foil substrate. The hotplate temperature set point was quickly ramped to 220° C. and held for three minutes followed by another quick hotplate temperature set point ramp to 425° C. and held for five minutes. The coated molybdenum foil was placed on the bench top and allowed to cool to room temperature.

The film was then analyzed in a Thermo K-Alpha XPS instrument using a monochromatic beam of the Al k-alpha (1486.60 eV) anode. Several 400 mm areas of the film were analyzed. Charge compensation was used. The film was stored under nitrogen and transferred in air as quickly as possible into the vacuum chamber of the XPS instrument. Data analysis was performed using Avantage version 4. The results are reported in Table 4, noting that the atomic percentages reported were normalized after neglecting the molybdenum percentage.

TABLE 4

|  | Element | | | |
| --- | --- | --- | --- | --- |
|  | Indium | Oxygen | Carbon | Nitrogen |
| Average Atomic % | 50.5 | 43.9 | 4.3 | 1.3 |
| Standard deviation Atomic % | 0.5 | 0.2 | 0.4 | 0.3 |

Example 14

Preparation of Group 3a Ink and Deposition of Film on Molybdenum Substrate

To a vial with a stir bar was added 0.360 g of indium (III) acetylacetonate (available from Sigma-Aldrich) and 4.42 g of 1,3-diaminopropane. The resulting mixture was stirred in a fume hood at room temperature, and 65 microliters (100 mg) of trifluoroacetic acid was added slowly in air. The vial was then capped and the mixture was stirred at 100° C. for 30 minutes, and then cooled to room temperature. The cap was removed and then 100 microliters (121 mg) of formic acid was added in air with stirring. The vial was then recapped, and the contents were stirred at 100° C. for 1 hour. The contents of the vial were left at room temperature for 48 hours with no stirring. A small amount of white precipitate formed and was filtered from the contents of the vial. The product solution with the precipitate removed was inerted by purging with nitrogen, and was transferred into a nitrogen glove box. A 1×1 cm piece of molybdenum foil was heated to 300° C. (hotplate setting). Two drops of the product solution were deposited onto the hot molybdenum foil. The product solution wetted the molybdenum foil, and rapidly evaporated, leaving behind a grey-whitish film deposit.

The film was then analyzed in a Thermo K-Alpha XPS instrument using a monochromatic beam of the Al k-alpha (1486.60 eV) anode. Several 400 mm areas of the film were analyzed. Charge compensation was used. The film was stored under nitrogen and transferred in air as quickly as possible into the vacuum chamber of the XPS instrument. Data analysis was performed using Avantage version 4. The results are reported in Table 5, noting that the atomic percentages reported were normalized after neglecting the molybdenum percentage. Note that at least 78.9 mole % of the indium deposited in the film was indium metal (i.e., assuming all of the oxygen present in the film was associated with the indium). Most likely, however, the actual percentage of metallic indium deposited was higher than 78.9%, given that at least some of the oxygen was likely associated with the carbon.

TABLE 5

| | Element | | | | |
|---|---|---|---|---|---|
| | Indium | Oxygen | Carbon | Nitrogen | Halogen |
| Average Atomic % | 58.7 | 18.6 | 16.0 | 1.9 | 4.8 |
| Standard deviation Atomic % | 14.5 | 5.9 | 7.4 | 1.2 | |

We claim:

1. A Group 3a ink, comprising, as initial components:
   a polyamine solvent;
   a Group 3a material/organic complex, wherein the Group 3a material/organic complex is a Group 3a material/carboxylate complex comprising an indium cation complexed with at least one carboxylate anion selected from 2-ethylhexanoate, 2-ethylbutyrate, acetylacetonoate, trimethylacetate, acetate, formate and isovalerate; and,
   a reducing agent selected from ammonium formate, formic acid, ammonium oxalate, heptaldehyde and oxalic acid;
   wherein the molar ratio to the Group 3a material/organic complex is at least 10:1;
   wherein the Group 3a ink is a stable dispersion and wherein the Group 3a ink is hydrazine and hydrazinium free.

2. The Group 3a ink of claim 1, wherein the polyamine solvent is selected from ethylenediamine; diethylenetriamine; triethylenetetramine; tetramethylguanidine; 1,3-diaminopropane; 1,2-diaminopropane; and 1,2-diaminocyclohexane.

3. The Group 3a ink of claim 1, wherein the Group 3a material/organic complex is a Group 3a material/carboxylate complex comprising an indium cation complexed with at least one carboxylate anion selected from 2-ethylhexanoate and 2-ethylbutyrate.

4. A method of preparing a Group 3a ink, comprising:
   providing a Group 3a material/organic complex;
   providing a reducing agent selected from ammonium formate, formic acid, ammonium oxalate, heptaldehyde and oxalic acid;
   providing a polyamine solvent;
   combining the Group 3a material/organic complex, the reducing agent and the polyamine solvent to produce the Group 3a ink;
   wherein at least 10 molar equivalents of the reducing agent is provided relative to the Group 3a material/organic complex; wherein the Group 3a ink is a stable dispersion; and wherein the Group 3a ink is hydrazine and hydrazinium free.

5. A Group 3a ink prepared according to the method of claim 4.

6. A method for providing a Group 3a metal on a substrate, comprising:
   providing a substrate;
   providing a Group 3a ink according to claim 1;
   applying the Group 3a ink to the substrate forming a Group 3a precursor on the substrate;
   treating the Group 3a precursor to provide a Group 3a metal on the substrate;
   wherein >85 mol % of the Group 3a metal provided on the substrate is in a zero valence state.

7. The method of claim 6, further comprising:
   optionally, providing a Group 1a source comprising sodium;
   providing a Group 1b source;
   optionally, providing a supplemental Group 3a source;
   optionally, providing a Group 6a sulfur source;
   optionally, providing a Group 6a selenium source;
   providing at least one Group 1a-1b-3a-6a precursor material comprising the Group 3a precursor material applied to the substrate, by optionally using the Group 1a source to apply a sodium material to the substrate, using the Group 1b source to apply a Group 1b material to the substrate, optionally using the supplemental Group 3a source to apply additional Group 3a material to the substrate, optionally using the Group 6a sulfur source to apply a sulfur material to the substrate and using the Group 6a selenium source to apply a selenium material to the substrate to form the Group 1a-1b-3a-6a precursor material;
   treating the precursor material to form a Group 1a-1b-3a-6a material having a formula $Na_L X_m Y_n In_{(1-n)} S_p Se_q$;
   wherein X is at least one Group 1b material selected from copper and silver; wherein Y is the Group 3a material; wherein the Group 3a material is selected from gallium, indium and aluminum; wherein $0<L<0.75$; wherein $0.25<m<1.5$; wherein $0<n<1$; wherein $0<p<2.5$; wherein $0<q<2.5$; and, wherein $1.8<(p+q)<2.5$.

8. The method of claim 7, wherein the Group 1a-1b-3a-6a material is a CIGS material having a formula $Cu_v In_w Ga_x Se_y S_z$; wherein $0.5<v<1.5$; $0<w<1$; $0 \le x \le 1$; $0<y \le 2.5$; $0 \le z<2.5$; and $w+x=1$.

* * * * *